US006986022B1

(12) United States Patent
Marshall et al.

(10) Patent No.: US 6,986,022 B1
(45) Date of Patent: Jan. 10, 2006

(54) BOUNDARY SYNCHRONIZATION MECHANISM FOR A PROCESSOR OF A SYSTOLIC ARRAY

(75) Inventors: John William Marshall, Cary, NC (US); Barry S. Burns, Apex, NC (US); Darren Kerr, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 512 days.

(21) Appl. No.: 09/978,640

(22) Filed: Oct. 16, 2001

(51) Int. Cl.
*G06F 15/80* (2006.01)

(52) U.S. Cl. ...................................... 712/19

(58) Field of Classification Search ................ 712/19, 712/13, 22, 221; 708/493, 622; 713/375
See application file for complete search history.

(56) References Cited

U.S. PATENT DOCUMENTS

| | | | | |
|---|---|---|---|---|
| 5,148,385 A | * | 9/1992 | Frazier | 708/426 |
| 5,434,995 A | * | 7/1995 | Oberlin et al. | 709/400 |
| 5,721,921 A | * | 2/1998 | Kessler et al. | 718/102 |
| 5,790,879 A | * | 8/1998 | Wu | 712/19 |
| 5,928,351 A | * | 7/1999 | Horie et al. | 712/11 |
| 6,101,599 A | | 8/2000 | Wright et al. | |
| 6,173,386 B1 | | 1/2001 | Key et al. | |
| 6,195,739 B1 | | 2/2001 | Wright et al. | |
| 6,223,228 B1 | * | 4/2001 | Ryan et al. | 713/375 |
| 6,272,621 B1 | | 8/2001 | Key et al. | |
| 6,442,669 B2 | | 8/2002 | Wright et al. | |
| 6,453,424 B1 | * | 9/2002 | Janniello | 713/500 |
| 6,466,988 B1 | * | 10/2002 | Sukegawa et al. | 709/248 |
| 6,505,269 B1 | | 1/2003 | Potter | |
| 6,513,108 B1 | | 1/2003 | Kerr et al. | |
| 6,529,983 B1 | | 3/2003 | Marshall et al. | |
| 6,711,700 B2 | * | 3/2004 | Armstrong et al. | 714/23 |

OTHER PUBLICATIONS

U.S. Appl. No. 09/978,647, filed Jan. 22, 2002, Marshall et al.

* cited by examiner

*Primary Examiner*—Eric Coleman
(74) *Attorney, Agent, or Firm*—Cesari and McKenna, LLP

(57) ABSTRACT

A mechanism synchronizes instruction code executing on a processor of a processing engine in an intermediate network station. The processing engine is configured as a systolic array having a plurality of processors arrayed as rows and columns. The mechanism comprises a boundary (temporal) synchronization mechanism for cycle-based synchronization within a processor of the array. The synchronization mechanism is generally implemented using specialized synchronization micro operation codes ("opcodes").

20 Claims, 7 Drawing Sheets

BOUNDARY SYNCHRONIZATION MECHANISM FOR A PROCESSOR OF A SYSTOLIC ARRAY

CROSS-REFERENCE TO RELATED APPLICATION

The present invention is related to the following co-pending and commonly assigned U.S. Patent Application Serial No. (112025-0455) titled, Barrier Synchronization Mechanism for Processors of a Systolic Array, which was filed on even date herewith and which application is hereby incorporated by reference as though fully set forth herein.

FIELD OF THE INVENTION

The present invention relates to synchronization of processors and, in particular, to synchronization within a processor of a systolic array.

BACKGROUND OF THE INVENTION

Computer architecture generally defines the functional operation, including the flow of information and control, among individual hardware units of a computer. One such hardware unit is the processor or processing engine, which contains arithmetic and logic processing circuits organized as a set of data paths. In some implementations, the data path circuits may be configured as a central processing unit (CPU) having operations that are defined by a set of instructions. The instructions are typically stored in an instruction memory and specify a set of hardware functions that are available on the CPU.

A high-performance computer may be realized by using a number of identical CPUs or processors to perform certain tasks in parallel. For a purely parallel, multiprocessor architecture, each processor may have shared or private access to non-transient data, such as program instructions (e.g., algorithms) stored in a memory coupled to the processor. Access to an external memory is generally inefficient because the execution capability of each processor is substantially faster than its external interface capability; as a result, the processor often idles while waiting for the accessed data. Moreover, scheduling of external accesses to a shared memory is cumbersome because the processors may be executing different portions of the program. On the other hand, providing each processor with private access to the entire program results in inefficient use of its internal instruction memory.

One place where a parallel, multiprocessor architecture can be advantageously employed involves the area of data communications and, in particular, the processing engine for an intermediate network station. The intermediate station interconnects communication links and subnetworks of a computer network to enable the exchange of data between two or more software entities executing on hardware platforms, such as end stations. The stations typically communicate by exchanging discrete packets or frames of data according to predefined protocols, such as the Transmission Control Protocol/Internet Protocol (TCP/IP), the Internet Packet Exchange (IPX) protocol, the AppleTalk protocol or the DECNet protocol.

In order to operate efficiently, individual processors in parallel, multiprocessor system must have a mechanism to synchronize. A barrier is a primitive that provides for the synchronization of two or more processors (or processes). When processors need to synchronize, each enters the barrier state. Only when all processors have reached the barrier state may any processor proceed with the execution of subsequent instructions. Barrier synchronization has traditionally been performed by software using, e.g., a semaphore. In a typical implementation of a semaphore, a counter located in a memory stores the number of units of a resource that are free. When a processor accesses the resource the counter is decremented, and when a processor finishes with the resource the counter is incremented. While the counter is at zero, processors simply "busy-wait" until the resource becomes free. A problem with this prior approach is that it consumes memory bandwidth in order to achieve processor synchronization.

When two processors or processes vie for access to a single shared memory resource, a more specialized implementation of a semaphore may be utilized. A single binary semaphore, such as a spin lock, may regulate resource access. A spin lock is a mechanism that allows for orderly access to a shared resource such as a memory. For example, a spin lock may ensure that only one processor or process accesses a segment of the memory at any given time. Each segment of the memory may have a spin lock associated with it and whenever a processor requires access to the segment, it determines whether the spin lock is "locked" or "unlocked". A locked status indicates that another processor is currently accessing that segment of the memory. Conversely, an unlocked status indicates that the segment is available for access. Thus, when a processor attempts to access a memory segment, it simply tests the spin lock associated with the segment to determine whether that segment is currently being accessed. If not, the testing processor acquires and locks the spin lock to exclude other processes from accessing the segment.

Generally, processors that access a particular segment at the same time compete for acquisition of the spin lock. Processors that fail to gain access typically wait for a period of time before reattempting access. These processors typically enter a finite loop that causes the processors to "spin" (hence the term "spin lock"). A waiting processor continually tests the spin lock until it gains access. A problem associated with this approach is that, as the number of processors competing for the spin lock increases, increased memory contention may arise which, in turn, degrades overall system performance.

In a parallel, multiprocessor system consisting of a systolic array (i.e., an arrangement of processors having a plurality of processors arrayed as rows and columns) a synchronization mechanism may be provided that synchronizes each processor on a "phase" basis. All processors of a column execute substantially the same program instruction code; moreover, all processors of the column access a single share resource (a column memory). Accordingly, a synchronization mechanism is desirable to reduce collisions directed to that shared, column memory resource. For example, assume a phase is 128 cycles in duration and, within each phase, there are a plurality of quarter phase (i.e., 32-cycle) boundaries or "phaselets". The processors of row 1 start their phase 32 cycles after the start of a row 0 phase, the processors of row 2 start their phase 64 cycles after the start of row 0 and the processors of row 3 start their phase 96 cycles after the start of row 0.

In such an arrangement, problems occur due to the fact that, within a phase, it is possible for the processors to become slightly non-synchronized within several clock cycles. Assume a first processor of a row 0 "stalls" because of a collision with a second processor of row 1 within its column on a memory reference to the shared memory resource. As a result, the operation to be performed by the first processor at cycle 1 actually occurs at, e.g., cycle 33. As noted, each processor of a column performs substantially the same work on packets entering the systolic array. Moreover the work performed by each processor may vary among phaselets of a phase. Because the first processor was "pushed out" 32 cycles from cycle 1 of phaselet 1 to cycle 33 of phaselet 2, row 1 of the systolic array has "gotten ahead" of row 0, thereby implying that certain work (actions) have completed that have not yet been performed. This adversely impacts the performance of the systolic array.

The present invention is thus generally directed to a system for synchronizing a processor of a systolic array. The invention is further directed to an efficient and accurate means for scheduling resources within the systolic array.

SUMMARY OF THE INVENTION

The present invention comprises a mechanism for synchronizing instruction code executing on a processor of a processing engine in an intermediate network station. The processing engine is preferably configured as a systolic array having a plurality of processors arrayed as rows and columns. The novel mechanism comprises a boundary (temporal) synchronization mechanism for cycle-based synchronization within a processor of the array. The synchronization mechanism is generally implemented using specialized synchronization micro operation codes ("opcodes"). The synchronization micro-opcodes differentiate the type of requested synchronization, e.g., local (temporal) synchronization or local synchronization based on a new barrier.

According to the invention, temporal synchronization provides the ability to "bound" a minimum execution latency through a code section. The start of the code section can be identified by either the start of a software phase, a barrier event or an instruction-initiated, boundary reference ("bref") micro-opcode. The end of the section is identified by the bsync micro-opcode. Specifically, temporal synchronization allows execution of a code sequence on a processor for a minimum duration, which is preferably specified in clock cycles within a duration register. If a given code path executed by the processor completes before the specified duration, then the processor stalls until the minimum duration has elapsed. If the path execution time is greater than or equal to the specified duration, then execution continues without incurring stall cycles.

While it is possible to balance all execution paths through a code section (sequence) with null operations ("no-ops"), such an approach consumes instruction memory space, while also reducing effective instruction memory utilization. Notably, temporal synchronization is based on a local reference event. The first event is automatic and occurs at the start of each new phase. An instruction-initiated reference using the bref micro-opcode creates a new reference point or a previous barrier can be used as a reference point.

In the illustrative embodiment, a barrier synchronization (bsync) micro-opcode is provided to enable barrier synchronization among two or more processors within a column of the processing engine. A processor participates in barrier synchronization by is asserting a participate signal that instructs logic within a barrier synchronization module to consider it for synchronization. The participate signal is preferably generated from a predetermined, bsync bit of a machine state register (MSR) within each processor. Moreover, interpretation of the bsync micro-opcode is based on the MSR bsync bit. When the bsync bit is asserted (e.g., "1"), the bsync micro-opcode requests barrier synchronization with all other participating processors. When the bsync bit is non-asserted (e.g., "0"), the bsync micro-opcode performs local synchronization and is cancellable.

Advantageously, the synchronization mechanism described herein provides "fine grain" synchronization capability without consuming substantial memory resources. That is, the inventive mechanism enhances latency as well as memory resource utilization. The memory resource enhancement is achieved by moving synchronization state information from memory to dedicated hardware registers.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
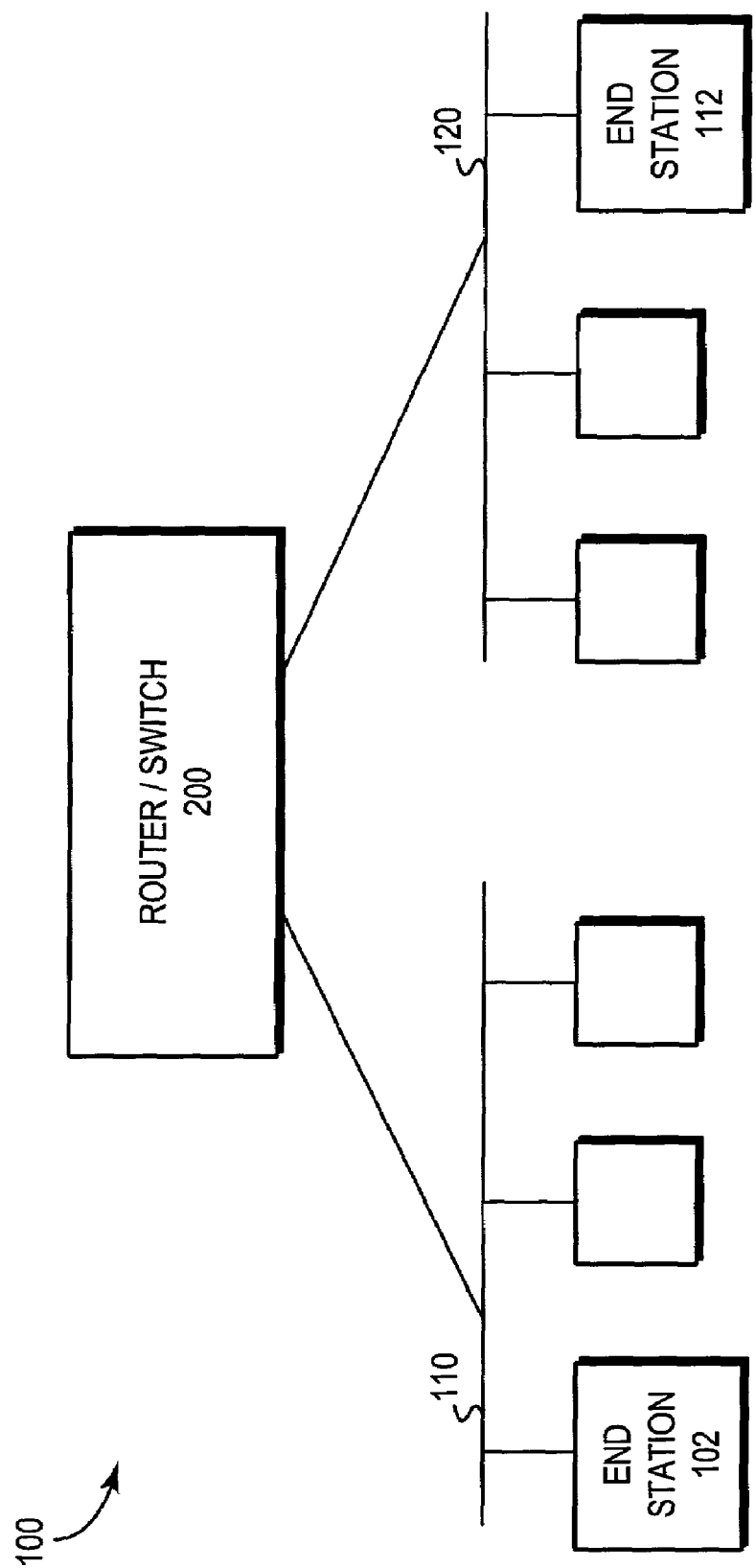
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising endstations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating stations according to a predefined protocol. For the illustrative embodiment described herein, the predefined protocol is the Internet protocol (IP), although the invention could be implemented with other protocols, such as the Internet Packet Exchange, AppleTalk or DECNet protocols.

Figure 2:
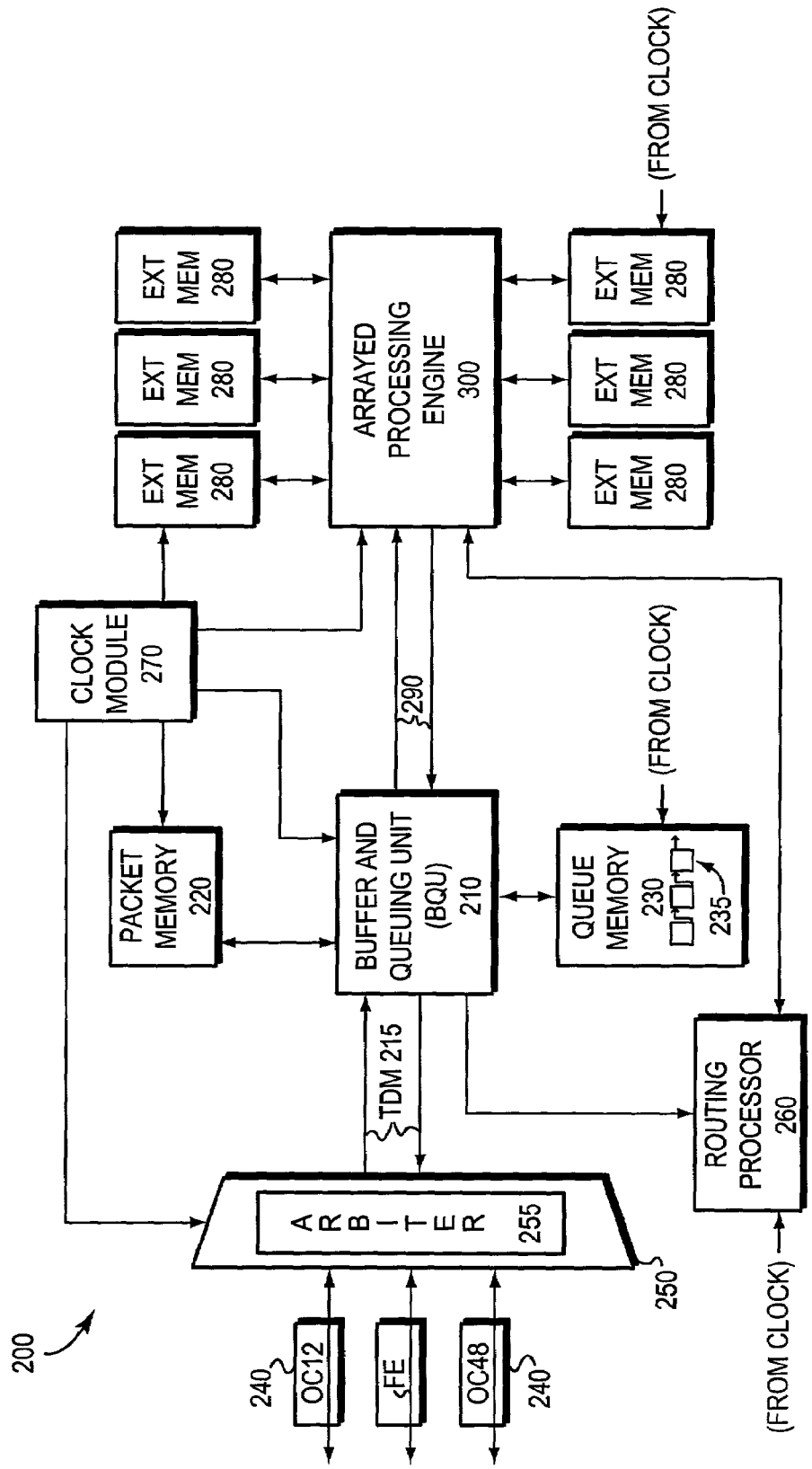
FIG. 2 is a schematic block diagram of intermediate station, such as a network switch, having an arrayed processing engine coupled to a memory partitioned into a plurality of external memory resources that may be advantageously used with the present invention.

FIG. 2 is a schematic block diagram of intermediate station 200 that, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the architecture described herein is the ability to program the station for execution of layer 2, layer 3 or higher-layer operations. Operation of the switch will be described with respect to IP switching of packets, although the switch may be programmed for other applications, such as data encryption.

The switch 200 comprises a plurality of interconnected components including an arrayed processing engine 300, various memories, queuing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of, e.g., 200 megahertz (i.e., 5 nanosecond clock cycles) and globally distributed them via clock lines to the components of the switch.

The memories generally comprise random access memory storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the inventive technique and mechanism described herein.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250 having an arbiter 255. The line cards 240 may comprise, e.g., OC12, OC48 and Fast Ethernet (FE) ports, each of which includes conventional interface circuitry that may incorporate the signal, electrical and mechanical characteristics, and interchange circuits, needed to interface with the physical media and protocols running over that media. A typical configuration of the switch may include many input/output channels on these interfaces, each of which is associated with one queue 235 in the queue memory 230. The processing engine 300 generally functions as a switching processor that modifies packets and/or headers as the BQU 210 implements queuing operations.

A routing processor 260 executes conventional routing protocols for communication directly with the processing engine 300. The routing protocols generally comprise topological information exchanges between intermediate stations to determine preferred paths through the network based on, e.g., destination IP addresses. These protocols provide information used by the processor 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
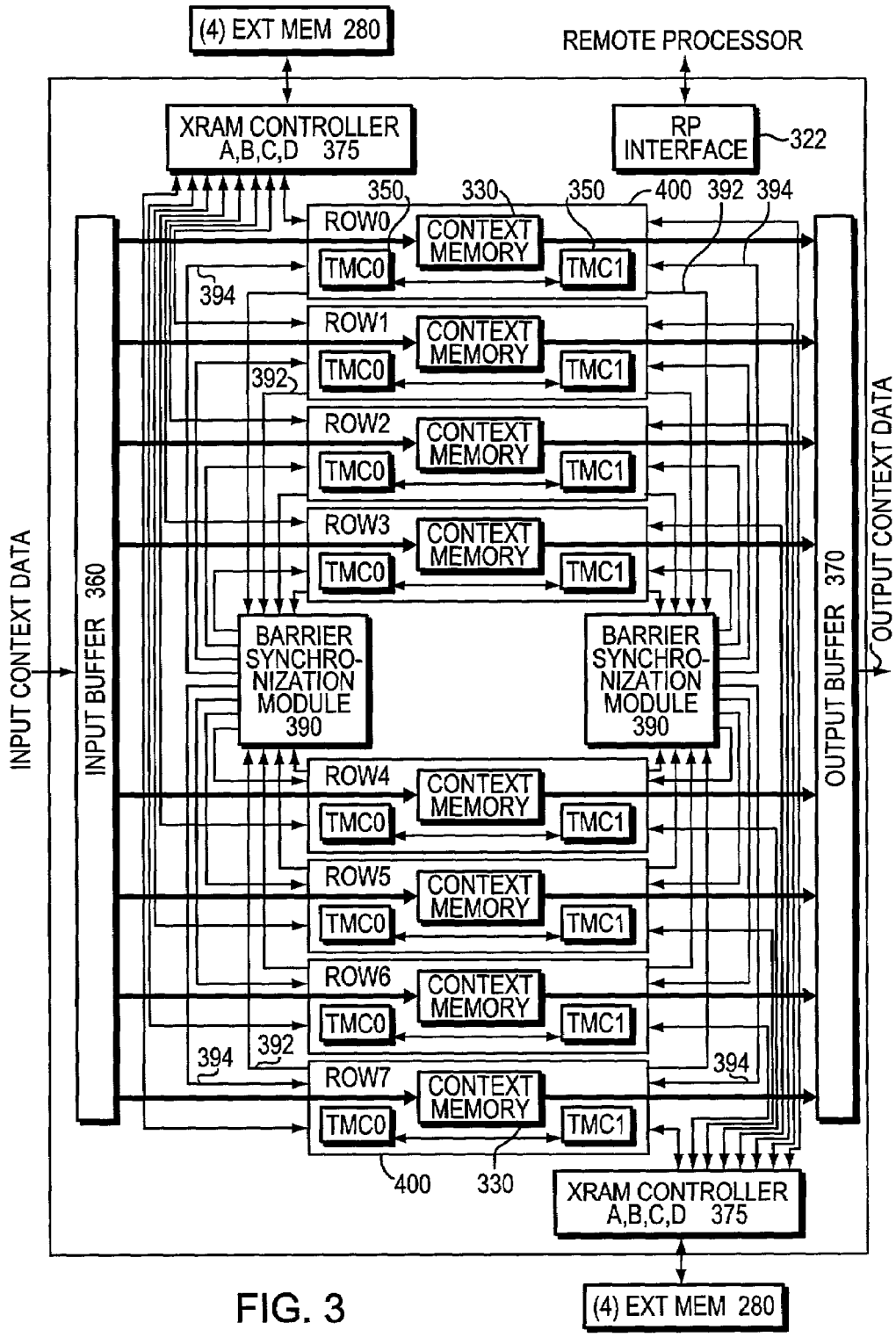
FIG. 3 is a schematic block diagram of the arrayed processing engine comprising a symmetric multiprocessor system configured as a multi-dimensioned systolic array.

FIG. 3 is a schematic block diagram of the programmable processing engine 300 which comprises an array of processors embedded between input and output header buffers with a plurality of interfaces from the array to partitions of an external memory. The external memory stores non-transient data organized within data structures for use in processing the transient data. The non-transient data typically includes "table" data contained in forwarding and routing tables, statistics, access filters, encryption keys and/or queuing information. Transient data (e.g., packet/frame data) enters and exits the engine via 64-bit input and output data interfaces of the BQU 210. A remote processor interface 322 provides information, such as instructions and data, from a remote processor (RP) to the processors and buffers over a maintenance bus having multiplexed address/data lines.

The processing engine 300 may comprise a symmetric multiprocessor system having a plurality of processors 350; moreover, the processors may be arrayed into multiple rows and columns, and further configured as a multi-dimensional systolic array. In the illustrative embodiment, the processors are arrayed as eight (8) rows and two (2) columns in an 8×2 arrayed configuration that is embedded between an input buffer 360 and an output buffer 370. However, it should be noted that other arrangements, such as 4×4 or 8×1 arrayed configurations, may be advantageously used with the present invention. As noted herein, a single processor supporting multiple threads of execution can take advantage of the invention. The processors of each row are connected to a context memory 330 and are organized as a cluster 400.

Specifically, the processors of each row are configured to sequentially execute operations on the transient data loaded by the input buffer 360, whereas the processors of each column operate in parallel to perform substantially the same operation on the transient data, but with a shifted phase. Each phase comprises a predetermined period of cycles, e.g., 128 cycles. Sequencing circuitry of the input buffer 360 controls the processors of each pipeline by ensuring that each processor completes processing of current transient data prior to loading new transient data into the pipeline at a new phase. In general, a new phase of processing is started, i.e., a context switch is performed, when all of the processors finish processing their current context and new, incoming context is completely received by the input buffer. An example of a system for controlling phase processing that may be suitable for use with the present invention is described in copending and commonly-owned U.S. Pat. No. 6,119,215, issued on Sep. 12, 2000 and titled Synchronization and Control System for an Arrayed Processing Engine, which patent is hereby incorporated by reference as though fully set forth herein.

Because they perform similar functions, the columned processors require similar non-transient "table" data. Therefore, the external memory is partitioned into a plurality of Ext Mem resources 280, each of which is dedicated to a respective column of processors. The Ext Mem 280 is configured with non-transient table data needed to support the similar function performed by the columned processors.

The processing engine 300 further includes a barrier synchronization module 390 associated with each column that provides support for barrier synchronization, generally for one barrier class (at a time). The barrier synchronization (bsync) module 390 is preferably implemented as a plurality of hardware registers and combinational logic configured to produce sequential logic circuit, such as state machines. The bsync module logic is further configured to receive at least one input (participate) signal 392 from each processor of the column over a data path coupling the processor to the module 390. The partipate signal indicates a participation status of the processor with respect to barrier synchronization. The bysnc module logic also provides an output (acknowledge) signal 394 over a data path to each processor of a column indicating when it is appropriate for each processor to advance in its program execution.

Since each processor of a column executes the same program code, only one bsync module is required per column. However, in an alternate embodiment, different rows of a column may execute different code (for different features) and, in that case, multiple bsync modules per column may be utilized in order to synchronize groups of processors, each executing code pertaining to a different feature within the column. In this latter case, the synchronization requirements of each "feature group" may be different and the different bsync modules enable implementation of those different requirements.

Figure 4:
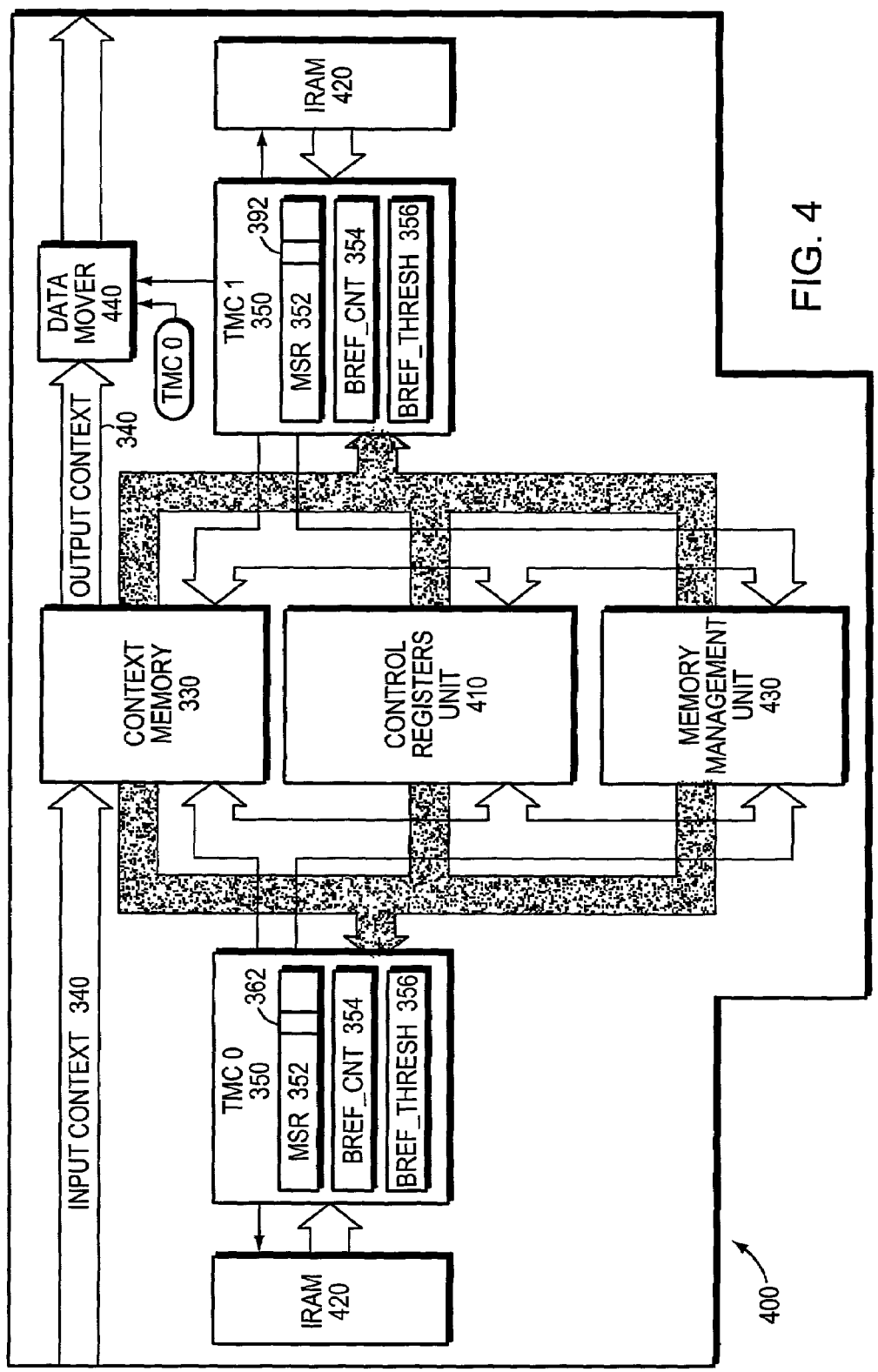
FIG. 4 is a schematic block diagram of a cluster, including a microcontroller (TMC) processor, of the arrayed processing engine that may be advantageously used with the present invention.

FIG. 4 is a schematic block diagram of a cluster 400. Each processor 350 of the cluster is coupled to an instruction memory (IRAM) 420 configured to store instructions for execution by the processor. Each processor is further connected to a control registers unit 410, the context memory 330 and a memory management unit (MMU) circuit 430, the latter configured to provide management of the context memory. Each processor 350 is preferably a customized, single-threaded microcontroller (TMC) core having a dense structure which enables implementation of similar cores on an application specific integrated circuit. The present invention may apply to any number of processors within a column and, in fact, to a single processor with multiple threads of execution, each of which attempts to access a single shared resource.

The TMC 350 is preferably a pipelined processor that includes, inter alia, a plurality of arithmetic logic units (ALUs) and a register file having a plurality of general purpose registers that store intermediate result information processed by the ALUs. In accordance with the present invention, each TMC further includes a plurality of special purpose registers, including a 16-bit machine state register (MSR) 352, a 16-bit count register (bref_cnt) 354 and a 16-bit threshold register (bref_thresh) 356. The MSR 352 is addressable by way of a high order byte and a low order byte. As described further herein, the participate signal 392 is preferably generated from a predetermined bit, i.e., bsync bit 362 of the MSR 352 within each processor. The state of the bsync bit 362 is preferably configured at initialization. Those processors participating in barrier synchronization assert the participate signal 392 to thereby instruct the bsync module 390 to consider them for synchronization.

The TMC processors 350 of each cluster 400 execute operations on transient data loaded into the context memory 330 by the input buffer 360, whereas the processors of each column operate in parallel to perform substantially the same operation on the transient data, but with a shifted phase. Transient "context" data (e.g., packet/frame data) are passed between the input and output buffers of the engine 300 over a data path channel 340 provided by a data mover circuit 440 coupled to the processor. The context data flowing through the cluster 400 is stored in the context memory 330 along with pointers that reference data structures and tables stored in, e.g., Ext Mem 280 for use by the TMC 350.

Each Ext Mem 280 generally comprises a plurality of (e.g., 8) banks or resources. The Ext Mem 280 is coupled to a plurality of external memory (XRAM) controllers 375, each of which, in the illustrative embodiment, is preferably embodied as a 200 MHz external memory interface coupled to the column of processors. The XRAM controller 375 is configured to enable shared columned processor access to the non-transient data stored in the external column memory. The shared Ext Mem 280 accessed by the processors may further comprise entries of data structures, such as tables, that are constantly updated and accessed by the processors of each column.

Assume the read access time for the Ext Mem 280 is 16 clock cycles and the write access time is preferably 10 cycles. If a read access to the memory resource occurs at, e.g., cycle 3, then the external memory resource 280 is busy ("tied up") until cycle 19. If the memory read access is directed to bank 0, then no other processor of that column can access bank 0 during those 16 cycles. Assume also that a processor of row 0 accesses bank 0 during cycles 3–19 of its first phaselet (32 cycles). Therefore the processor of row 1 within that column cannot access bank 0 during, e.g., cycles 99–115. Similarly, the processor of row 2 within that column cannot access bank 0 during cycles 67–83 and the processor of row 3 within that column cannot access bank 0 during cycles 35–51 of its instruction code.

Moreover, the processor of row 0 must wait until cycle 19 to schedule a second memory access operation to bank 0. If there was no meaningful work for the processor to perform during, e.g., cycles 3–19, a previous solution is to have the processor execute null operations ("no-ops") from cycles 3–19 while waiting to issue its memory access instruction to bank 0. As described herein, the memory access operation to bank 0 may be scheduled at cycle 4 using a synchronization mechanism (e.g., local or temporal synchronization) that specifies delaying execution of that memory access until cycle 19 of that phase. This aspect of the present invention decouples the control flow of microcode executing on a processor from the memory reference operations.

The present invention comprises a mechanism for synchronizing instruction code executing on a processor of the processing engine. The synchronization mechanism is generally implemented using a barrier synchronization (hardware) module and specialized synchronization micro operation codes ("opcodes"). The barrier synchronization module is used to guarantee that, in the case of barrier synchronization, all participating processors are at the same relative instruction before any processors can proceed. The synchronization micro-opcodes differentiate the type of requested synchronization, e.g., local (temporal) synchronization, column barrier synchronization or local synchronization based on a new barrier. Use of the specialized synchronization micro-opcodes is "out of band" to the extent that invocation of synchronization does not consume an instruction that would otherwise be used to manipulate data for use by the processor. This is realized by way of, e.g., a bit in the instruction code that specifies that a particular instruction requires synchronization based on a preconfigured barrier.

According to invention, the synchronization mechanism involves boundary (temporal) synchronization, which is time-based relative to a marker. As described herein, another synchronization mechanism involves barrier synchronization, which is directed to adjacent participating processors. Temporal synchronization involves the marking of points (cycles) of the code to measure references issued by a processor of the array. Synchronization may be marked from cycle 0 (at the beginning of a phase) through time or relative to a marker within the phase. The criteria needed to advance temporal synchronization include a threshold value (a delay value in cycles) and a duration (timer) value.

Barrier synchronization enables synchronization among two or more processors, e.g., up to a total of 8 processors, within a column of the forwarding engine. That is, the barrier synchronization function allows all participating processors within a column to reach a common point within their instruction code sequences before any of the processors proceed. In the event that all processors do not reach their barriers at the same time, the first processor to reach the barrier stalls until the last participating processor reaches its barrier. All processors are released at the same cycle.

Broadly stated, the synchronization mechanism allows a "boundary" to be placed within the instruction code executed by the processors of a column such that each processor of the column checks to see whether the boundary condition has been met before it can continue executing its code. If the boundary condition has not been met, the processor stalls until the previous processor has completed the instruction necessary to satisfy the boundary condition. Upon "start up", each processor of a column performs the same boundary check and stalls until the condition is satisfied. The mechanism thus allows the processors of a column to more quickly align (synchronize) among themselves as a result of a stalled condition with one of the processors.

Previously, such an alignment took place at the end of a phase using a processor completion (e.g., a pdone) signal configured to advance the phases of the pipeline in the systolic array. However, use of the pdone signal as a means for realigning processors as a result of a stalled condition is too coarse for processors configured to perform multiple tasks per phase. That is, the pdone signal would be sufficient to realign the processors of a column if each processor only performed on a single task within a phase. Since the processors may perform multiple tasks per phase, some tasks of which are order-dependent, a coarser means for resynchronizing the processors is needed. The synchronization mechanism described herein enables realignment of the processors of a column prior to the end of a phase (i.e., within the phase).

In the illustrative embodiment, a barrier synchronization module is provided for each column 0 and 1 of the systolic array to support intracolumn synchronization. Barrier synchronization is implemented by way of the barrier synchronization module and a barrier synchronization (bsync) micro-opcode. The format of the bsync micro-opcode is as follows:

bsync

Interpretation of the bsync micro-opcode is based on the state of the bsync bit 362. When the bsync bit is asserted (e.g., "1") and a processor encounters a bsync micro-opcode, a barrier synchronization mode request is invoked and processed by barrier synchronization logic implemented by the bsync module 390. Here, the bsync micro-opcode indicates an external event that requests synchronization among all participating processors of the column. When the bsync bit is not asserted (e.g., "0"), the bsync micro-opcode invokes a temporal synchronization mode and is cancellable. As described further herein, a combination of these modes is possible whereby barrier synchronization is invoked and then temporal synchronization (delay) may be provided relative to that barrier. In this case, the bsync bit 362 is asserted for barrier operation. Therefore, the MSR 352 differentiates the mode of synchronization for operation by each processor of the systolic array. Notably, only one bit of state per processor is needed to achieve barrier synchronization.

When configured for barrier synchronization, the bsync micro-opcode imposes a minimum stall of one cycle. Each processor indicates barrier participation by asserting its participate signal 392 that instructs logic within the barrier synchronization module to consider it for synchronization. The following assembler code invokes barrier synchronization:

smsr sel, Mask, Value

The set machine state register (smsr) instruction includes a selection field (sel) along with a mask operand (Mask) and a value operand (Value). The smsr instruction selectively updates the lower or upper byte of the MSR by specifying a state of the sel field. For example, if the sel field is 0, the upper byte is modified with the Mask and Value operands. In the illustrative embodiment, the smsr instruction specifies the low order byte, a Mask of 0x40 and a Value of 0x40. Therefore, the bsync bit 392 is preferably bit 6 of the lower order byte of the MSR 352.

The smsr instruction may occur in the instruction code anywhere previous to synchronization being requested. For example, barrier synchronization may occur immediately after the smsr instruction. After the smsr instruction there may be a series of opcodes and, for example, a branch instruction prior to reaching the instruction that includes bsync micro-opcode. An example of the entire latter instruction is an instruction word having an A (M unit) portion and a B (S unit) portion with the bsync operation occurring in a micro-opcode portion of the instruction word. Notably, synchronization is keyed from the bsync micro-opcode portion of the instruction word. Note also that the latter instruction can merely include the bsync micro-opcode and does not need to reference the M unit or the S unit operations.

The smsr instruction is used to initialize the barrier synchronization process and the bsync micro-opcode "stalls" until all participating processors associated with the barrier synchronization process finish. At that time, the code sequence executed by the processors continues normally. As a result, the bsync micro-opcode functions as a barrier such that all instructions prior to bsync must complete before any of the participating processors can proceed with execution of their code. This provides an opportunity to synchronize across all participating processors at a point within a phase (rather than at the end of a phase). For example, if it is desired to guarantee that all participating processors synchronize at a phaselet boundary, then each participating processor has 4 bsync micro-opcodes inserted within its instruction stream at, e.g., cycles 1, 33, 65 and 97 of a 128-cycle phase. There may be additional bsync micro-opcodes inserted within the stream depending on the need to further synchronize within a phase. The bsync module "stalls" those processors completing their execution before the barrier (point in time).

Figure 5:
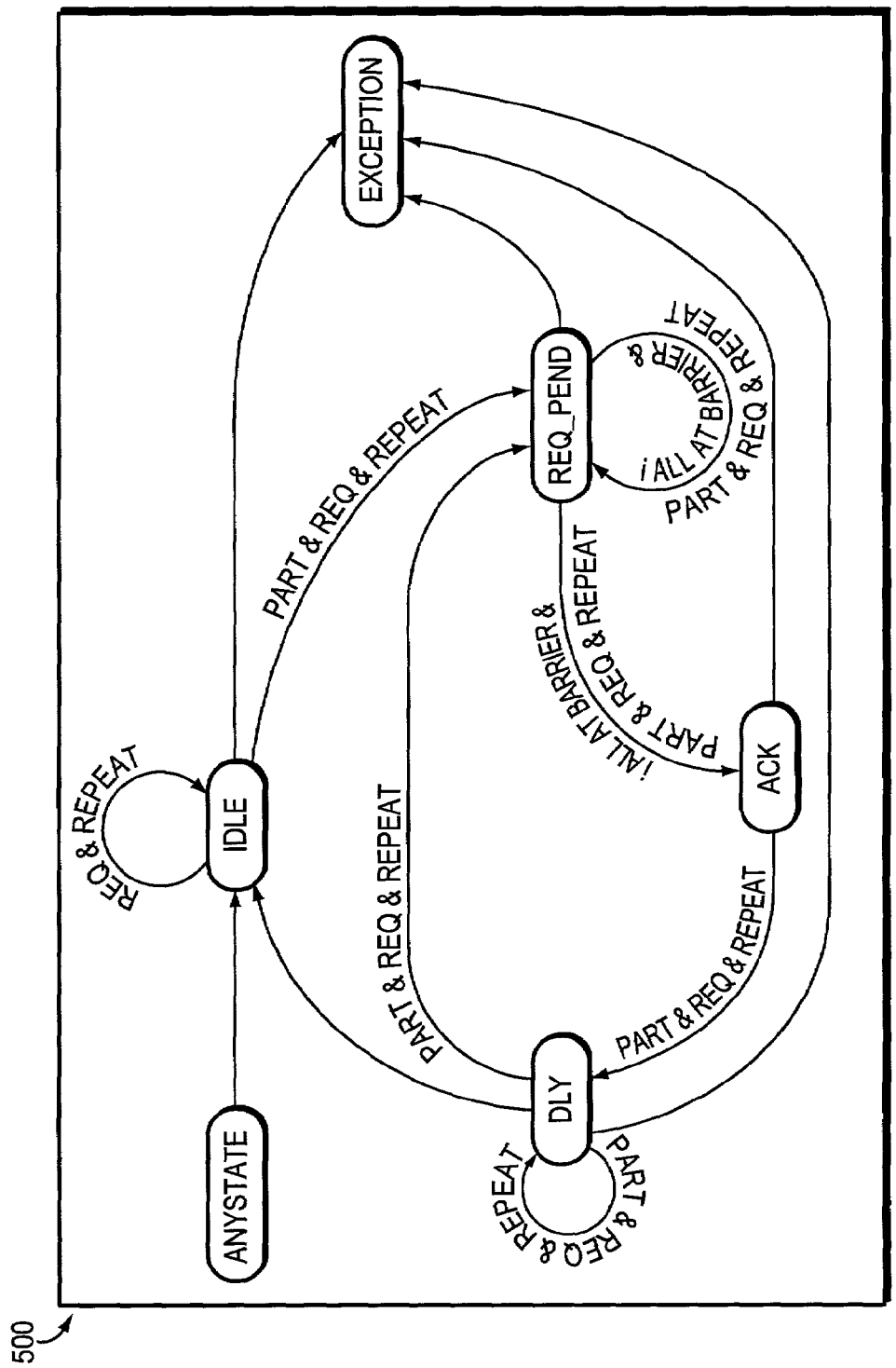
FIG. 5 is a schematic block diagram illustrating a state machine associated with each requesting processor within a barrier synchronization module.

FIG. 5 is a schematic block diagram illustrating a state machine 500 that is replicated for each requesting processor within the barrier synchronization module 390. The barrier synchronization module preferably maintains 8 instances of the state machine 500, each of which operates on a per TMC processor basis. In the illustrative embodiment, interstate machine dependencies are controlled by an iAllAtBarrier signal that is asserted when all participating processors indicate that they have reached a specified barrier. This event is communicated via the processor by the bsync micro-opcode. Execution of the bsync micro-opcode does not complete until the iAllAtBarrier signal is asserted. The following is a description of the various states of the state machine:

IDLE—The idle state indicates no activity. The normal transition is to the request pending (REQ_PEND) state. A request pending transition occurs when a processor indicates barrier participation by asserting the participate (part) signal. As noted, barrier participation is controlled by the state of the bsync bit 362 in the MSR register 352 of each processor. For multiple barrier configurations, a second register is needed to identify the specific barrier, barrier_part_n, where n identifies the specific barrier module. As described below, an exception (EXCEPTION) state is used to capture errant programs. The bsync exception causes all processors to stop or enter an exception handler.

REQ_PEND—The request pending state indicates that a processor has reached its barrier event. This event is identified by a request (req) signal generated from the operand fetch stage of execution of the bsync micro-opcode. When all other participating processors have reached the same state, the iAllAtBarrier signal is generated via the bsync logic which causes the state to transition to an acknowledge (ACK) state. A (EXCEPTION) condition is also provided to detect exception conditions. The REQ_PEND state preferably maintains a limit timer that begins counting upon state entry. If a transition does not occur within the specified time interval, the limit timer causes an exception. Under normal operation, the limit time should not cause an exception.

In the illustrative embodiment, the limit timer provides a mode to stop counting if any of the participating processors have stopped due to a programmable break point or have been switched into single step mode. This ensures that a debug operation does not create an unnecessary exception. For example, a limit time of 1000 cycles may be sufficient under normal operation; however, during debug, the timer may expire causing an unnecessary exception.

ACK—The acknowledge state is used to signal the participating processors to complete execution of the bsync micro-opcode. This state causes an acknowledge (ack) signal to be sent (driven) to all processors. The state normally transitions to a delay (DLY) state. The exception transition occurs if the processor is reset.

DLY—The delay state is used to compensate for the latency between assertion of the ack signal and de-assertion (dropping) of the req signal by the processor. A repeat signal is used to indicate the 2nd to Nth cycle of a request. The repeat signal is not asserted for the first cycle of a new request. Two normal transitions occur from this state. The REQ_PEND transition is caused by back-to-back bsync operations. The transition is identified by assertion of the req signal during deassertion of the repeat signal. The IDLE transition occurs as a result of the processor dropping both the req and repeat signals. The DLY state holds until the repeat signal deasserts. The DLY state is also needed for situations wherein the processor has stalled for a reason other than that caused by the bsync micro-opcode.

EXCEPTION—The exception state indicates that an unexpected event has been identified. This state causes an exception handler of the processor to be notified. The barrier synchronization module must be reset to disable this state.

In addition, each barrier synchronization module illustratively contains the following registers accessible from the RP:

BSYNC_disable[7:0] Disable processor from participation in barrier synchronization. A disabled processor cannot cause a basic exception;
BSYNC_EMASK[7:0]: Exception mask; and
BSYNC_ER[7:0]: Exception register.

As noted, temporal synchronization is invoked when the bsync bit 362 of the MSR 352 is not asserted (e.g., "0"). Here, there is no need to indicate participation with other processors to the bsync module 390 because temporal synchronization is relative to a particular TMC processor; that is, temporal (local) synchronization is relative to a time reference within an individual processor. Temporal synchronization specifies (on a memory reference) an offset from the beginning of a phase, or relative to a "marker", at which execution of the memory reference instruction may be delayed. If a processor stalls and "hits" the delayed instruction at a point that exceeds the offset specified by the invention, then the processor executes the instruction immediately.

In the illustrative embodiment, the temporal synchronization mechanism comprises boundary logic such as the count register, bref_cnt 354, and the boundary reference threshold register, bref_thresh 356, to identify the synchronization criteria. Both registers are mapped in the local register space of each TMC processor. An optional boundary reference (bref) instruction opcode is provided to selectively reset bref_cnt 354, which contains a timer value (in cycles) relative to a specified reference point, and to identify the start of a new synchronization interval. In the absence of the bref opcode, the timer value is referenced from the beginning of the phase. The bref instruction also sets the threshold value that is subsequently used for comparison with the timer value. That is, the bref instruction causes the assignment of a threshold value specified within the bref instruction to a duration register (e.g., bref_thresh 356). The threshold value specifies a minimum count value (duration) that allows the bsync micro-opcode to complete.

Specifically, the timer value contained within bref_cnt 354 indicates the number of clock cycles that have elapsed since the start of phase or since the last bref opcode. The bref_cnt 354 is preferably a "saturating" counter wherein the timer value never "wraps" to 0 from e.g., 0xFFFF. That is, the counter contains values 0-0xFFF and holds when the count reaches 0xFFFF. The timer value may be reset to 0 at the start of a new phase and subsequent counting begins relative to the start of that phase. The timer value may also be reset to 0 in response to a bref opcode having a special operand bit that resets the timer. The format of the bref instruction is as follows:

bref sel, threshold
wherein the select (sel) field is a 1-bit operand used to selectively reset bref_cnt 354. In the illustrative embodiment, if the sel field is set to "0" then bref_cnt is not reset, the timer is not cleared and counting takes place relative to the start of a phase. On the other hand, if bref_cnt 354 is cleared, a marker is established within the phase and counting begins relative to that marker. The threshold field of the bref instruction contains the threshold value assigned to bref_thresh 356. The bref_cnt and bref_thresh registers are updated during an execution phase of the TMC processor. The following test is applied by the processor to determine if the bsync micro-opcode is past the boundary and is allowed to complete without stalling:
bref_cnt $\leq$ bref_thresh For boundary (temporal) synchronization, execution is suspended until the content of bref_cnt 354 is greater than or equal to the value of bref_thresh 356. This condition is also evaluated during the execution phase. The bsync micro-opcode stalls in the execution phase until the boundary condition is satisfied. As noted, the bref_thresh register is written by the bref opcode; a typical value for the threshold register is generally "small". As an example, assume the following code sequence section:

bref 1, 16
    fpf t3, 4(r6)
    bsync

An instruction, such as a fast prefetch instruction (fpf), is executed to prefetch data from an external memory location, 4(r6), and store that data at a particular tag location (tag 3) of the memory management unit. Assume further that it is desired to have this instruction execute at a particular point in time (e.g., cycle 16 of a phase). To that end, the bref opcode may be placed before the fpf instruction within the instruction stream executed by the processor. If the sel field of the bref instruction is asserted to clear the timer, a marker is established from which counting begins within the phase. A threshold value of "16" within the bref instruction denotes that execution of the fast prefetch instruction is delayed 16 cycles from the occurrence of the fpf instruction. On the other hand, if the select field is not asserted (0) to thereby not clear the bref timer, then the fpf instruction is delayed until cycle 16 (relative to the start of the phase).

To stall the fpf instruction for 16 cycles, a bsync instruction is placed in the micro-op field of the instruction word. However, if it is desirable to not stall the fpf operation but rather wait 16 cycles until the value in tag 3 is valid, then the bsync instruction is placed in the micro-op field of a subsequent access (e.g., read) instruction word. Notably, there is always a bref/bsync instruction pair for boundary (temporal) synchronization. Therefore, the bsync instruction effectively "anchors" a code sequence initiated by the bref instruction to thereby control the logic that essentially stalls the processor as to when to execute the instruction embedded within the bref and bsync instructions. The bref/bsync pair of instructions can thus be used to structure when a particular instruction occurs within the instruction steam.

If it is desirable to stall/delay execution of an instruction relative to the beginning of a phase, the 1-bit select field is not asserted (0), the timer is not cleared and the count proceeds relative to the beginning of the phase to the value of the threshold counter (e.g., 64). As another example, assume the following code sequence:

bref 0, 64
    fpf t4, 8(r5)
      bsync

Here, the bref instruction has its sel field equal to 0 and the threshold field equal to 64. The bsync instruction anchoring this particular bref instruction cooperates with the bref instruction to essentially test relative to the established threshold to determine how long to stall the embedded instruction, e.g., fpf t4, 8 (r5). As for this latter instruction code sequence, if there are further delays within the phase and this particular bref instruction is encountered at, e.g., cycle 65, the embedded fpf instruction is executed immediately. On the other hand, if the bref instruction is encountered at, e.g., cycle 32, then execution of the embedded fpf instruction is stalled (delayed) until cycle 64.

The temporal synchronization aspect of the invention conserves the limited capacity (e.g., 2 or 4 kilobytes) of the IRAM 420 by avoiding consumption of that instruction space with the plurality of no-ops that would typically be inserted in the instruction stream while waiting for bank 0 to become available. In addition to conserving IRAM space, the special opcode aspect of the invention makes coding easier for a more complicated situation involving branch delays. Another advantage of the invention is manifested with respect to error correction capability (ECC) in the IRAM. If the IRAM "takes" an error, an error correction phase may delay (from a code perspective) all other instructions that operate in order.

For example, a correctable bit error in the IRAM may take 3 additional cycles of processor time to correct. The temporal synchronization mechanism may account for (completely absorb) those additional cycles, although it may make the system run slower. Note that the correction of bit error errors using ECC memory in the IRAM alters the latency in the instruction code and is completely random (i.e., cannot be predicted). Memory refresh operations, although occurring periodically, still disrupts orderly access to the memory. In general, the greater the "offset" (i.e., delay value in cycles), the more likely the code is able to "absorb" and recover from unpredictable events. Thus, the invention essentially avoids a "continuous stall" condition with respect to a memory reference pattern.

Figure 6:
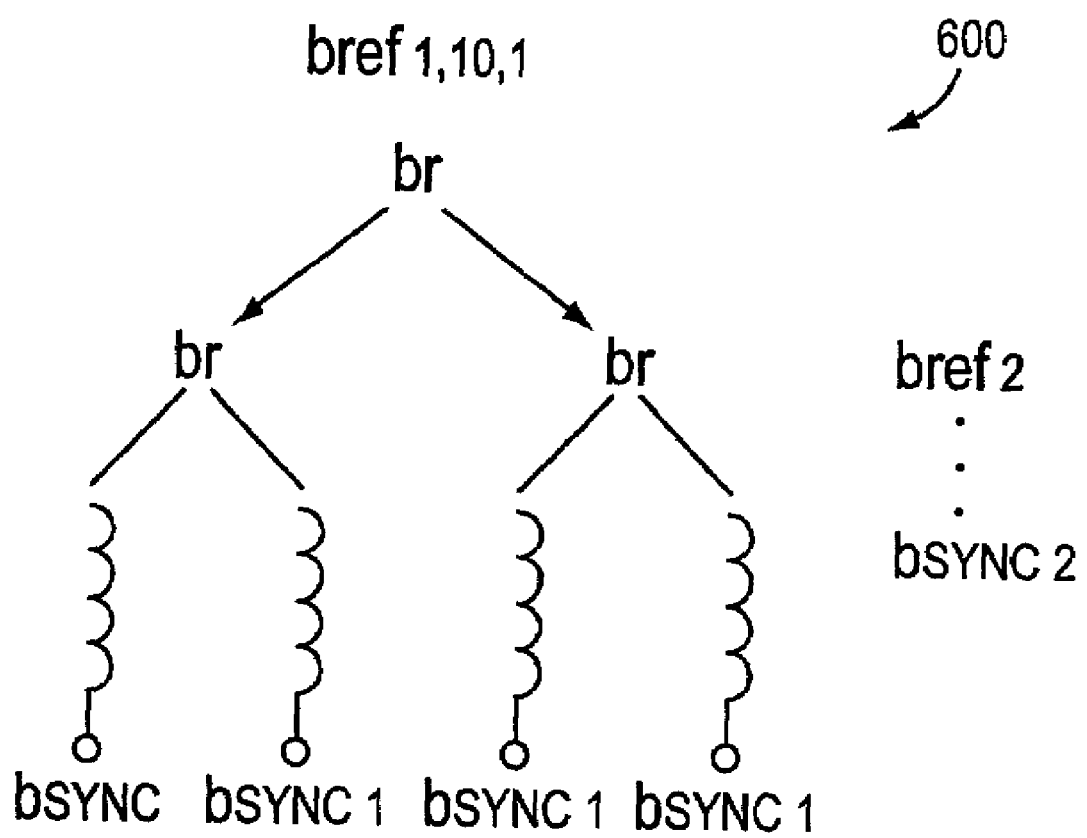
FIG. 6 is a schematic block diagram illustrating a branch instruction tree.

In yet another example, assume control code structured as a branch instruction tree having multiple branch points and multiple decisions. FIG. 6 is a schematic block diagram illustrating the branch instruction tree 600. Prior to entering the tree 600, a bref instruction is provided having an asserted sel field and a threshold value of, e.g., 10. Each branch has a bsync instruction (bsync 1) "anchoring" the bref instruction (bref 1, 10, 1) to ensure that memory references within each of the branch points execute at the same relative point in time. To that end, the bsync instruction cooperates with the bref instruction to essentially delay such execution for a threshold of 10 cycles from the start of the code (immediately after the bref instruction). This is an example of redefining a new relative place in the instruction code sequence in accordance with temporal (boundary) synchronization.

The bsync/bref instruction pair is needed to reestablish the threshold specified by the bref instruction. That is, the bsync instruction is needed to anchor a previous bref instruction to thereby provide a reference point for reestablishing the threshold specified by the bref instruction (and to enable subsequent use of bref instructions within the instruction stream for delaying execution of defined instructions). If the threshold is not reestablished at a defined point of the instruction code, all subsequent bref instructions would continue without a reference point.

Another embodiment described herein contemplates a combination of barrier/boundary synchronization. Such a combination not only ensures that all processors of a column are in the same relative location of the instruction code with respect to each other, but also, on an individual processor basis, delays a particular instruction for a predetermined number of cycles within the phase. Here, if instruction code executed by processors of a column becomes unsynchronized, execution of a barrier instruction would synchronize all participating processors to the same relative point within the instruction code sequence. Thereafter, a processor of any given row of the column may be further delayed relative to a local value until it can proceed with program execution. To that end, the barrier (bsync) instruction is executed first to ensure that all participating processors are at the same relative point within the instruction code. Upon successful completion of the bsync instruction, an individual boundary reference (bref) threshold value may be triggered from that bsync instruction before program execution for that individual processor proceeds.

In an alternate embodiment, a plurality of bsync modules may be utilized to create different groups of participating processors within a column. A special synchronization opcode is needed to specify which synchronization module is applied to the applicable instruction. Here, the bsync instruction may include an additional operand that indicates to which bref instruction it is "anchored". This allows "nesting" of bref/bsync pairs of instructions. Referring again to FIG. 6, by providing an additional operand for both the bref and bsync instructions, a last bsync instruction (e.g., bsync 1) may be anchored with a first bref instruction (e.g., bref 1, 10, 1), whereas an intermediate bref/bsync pair of instructions (e.g., bref 2 and bsync 2) may be linked. Of course, there may be situations wherein a single bsync instruction is used for both barrier and temporal (boundary) synchronization. That is, the single bsync opcode may be used to synchronize among all participating processors with respect to a bsync module 390 and, in addition, provide an anchor to a boundary reference for a code sequence within the instruction stream of an individual processor.

Therefore, there are two sets of state that must be addressed for the combination embodiment involving multiple synchronization targets. The first set of state involves replicating the barrier synchronization logic to provide a plurality of (n) barrier modules per column of processors. To effectively utilize these modules, a plurality of (n) participation signals per processor is needed. In the illustrative embodiment, these participation signals may be manifested by additional bits in the MSR 352 of each processor 350, wherein each bit is associated with a particular bsync module or participating group of processors within the column.

In addition, when requesting a particular barrier within which to participate, a mechanism is needed to identify one of n barriers with which to participate. In the illustrative embodiment, this may be achieved by providing an operand to the bsync instruction that specifies with which bsync module it is associated. If the barrier instruction is associated with more than one bsync module (or participating group) then a bit-mask may be provided for each bsync instruction to thereby associate that instruction with multiple barriers.

The second set of state involves replicating boundary logic per processor. The boundary reference (bref) logic and instruction format may be extended to include, e.g., a plurality of (x) timers along with a plurality of (x) threshold values. The bref logic may be extended to require multiple threshold and count registers (e.g., multiple bref_cnt 354 and bref_threshold 356 registers) per processor. As a further embodiment, a multi-opcode instruction word format may be provided that enables, e.g., two micro-opcodes (bref and bsync) to be issued within one instruction word. A schematic illustration of the format of such an instruction word is:

Mxx (A portion)
Sxx (B portion)
  bref opcode (bit field)
  bsync opcode (bit field)

In addition to an A portion (Mxx) and a B portion (Sxx) of the instruction, the micro-opcode field comprises two subfields, one for the boundary reference (bref) opcode and the other for its associated barrier synchronization (bsync) opcode. Furthermore, each bref and bsync opcode may include a bit field operand so as to specify participation with multiple boundaries and multiple barriers. The use of multiple micro-opcodes within the opcode field represents an independent case of barrier/boundary synchronization wherein both of these conditions must be met before program execution proceeds, although the order with which these instructions are counted does not have to be maintained. In contrast, the combination embodiment described previously represents a dependent case of barrier/boundary synchronization wherein the barrier synchronization occurs first and then the boundary reference threshold is counted relative to that barrier.

To support multiple barrier operations, a new opcode is provided to identify the set of possible barriers for which each processor may participate. The bsync micro-opcode format is modified for multiple barrier and boundary operations. As noted, each TMC processor can participate with a single barrier using a participate signal from the processor to the barrier module. Multiple participation signals are needed for multiple barriers. For each column, the barrier synchronization module is replicated n times.

Figure 7:
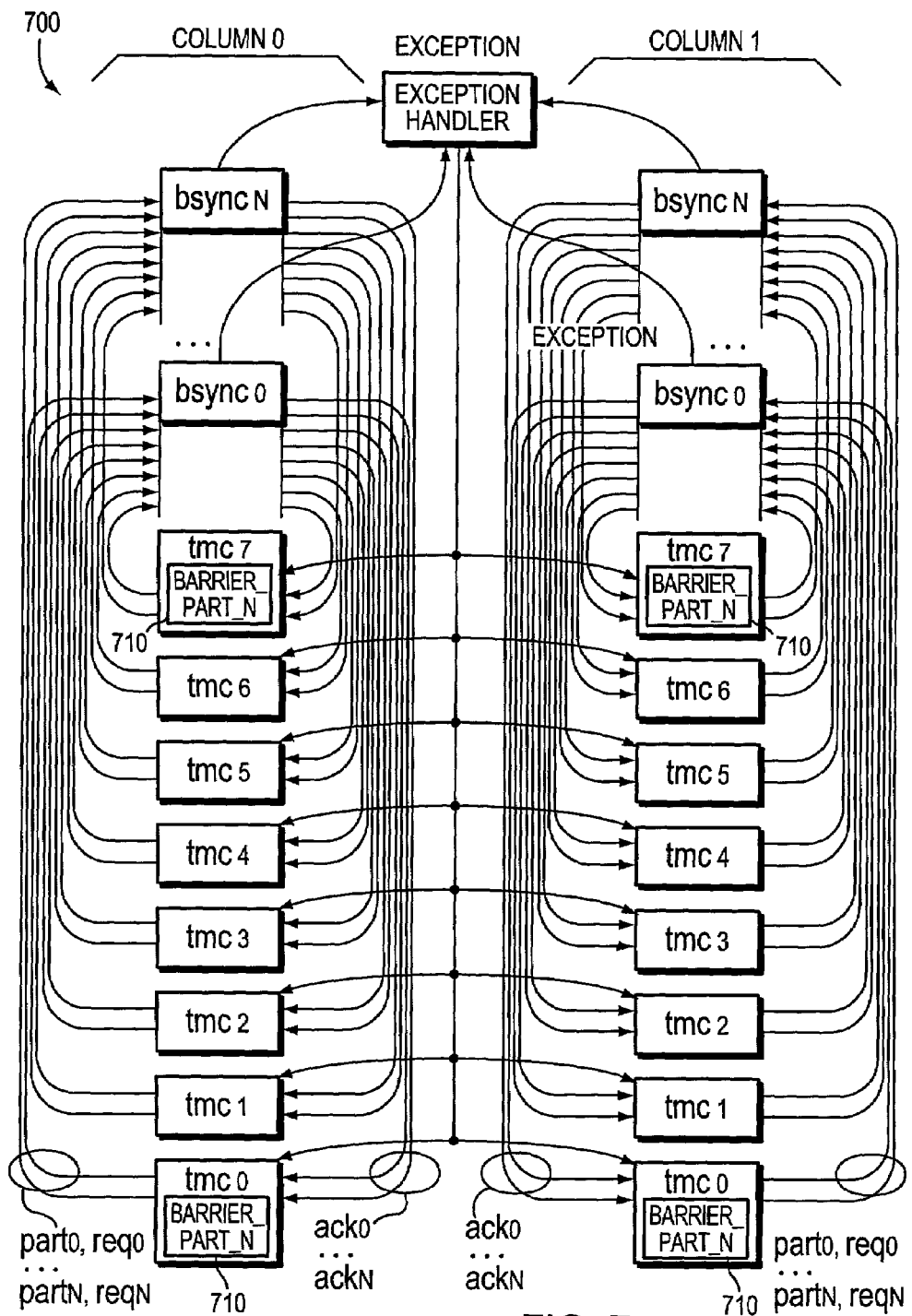
FIG. 7 is a schematic diagram illustrating a multiple barrier connection topology.

FIG. 7 is a schematic diagram illustrating a multiple barrier connection topology 700. For multiple barrier synchronization modules (bsync 0-N), each processor maintains its own barrier_part_n register 710, wherein n specifies the set of barriers to which the processor participates. Preferably, the register is n bits wide where each bit is associated with a specific barrier module. A BPART opcode is used to modify the barrier_part_n register. The following assembler code selects two barriers:

BPART 0 x3

The BPART opcode is preferably coded in the B portion of an instruction word and has two operands: a mask (e.g., 0 x3) used to select the set of bits to be modified and a value operand. The value operand specifies a new value (e.g., 0 x3) for the selected bit.

The bsync micro-opcode is modified to provide an operand mask that selects a set of barrier modules. Multiple barriers are specified by setting bits in the operand that correspond to the barrier synchronization modules. The bit in the bsync operand is decoded to drive, e.g., req0-reqN. The following assemble code synchronizes with two barriers:

BSYNC 0 x3

Completion of the bsync micro-opcode occurs after acknowledgement by all of the barrier synchronization modules. Because the acknowledgement is sent to each processor as a single cycle pulse, a bsync micro-opcode execution unit of each processor must collect and save this state before allowing this instruction to advance. Each selected req[0-N] and part[0-N] signal is driven until all acknowledgements are received.

To support a plurality of boundary synchronization operations, an additional operand is provided to the bref opcode to select a specific boundary condition. The bysnc opcode also requires an additional operand. Two implementations are useful depending upon the number of concurrent boundary synchronization events. The first implementation provides an additional operand that explicitly defines the set of boundary conditions. This is effective for a relatively small number, e.g., 4 or less. If more synchronization conditions are needed, then the second implementation provides a dedicated register. The dedicated register is necessary primarily from a coding perspective since the micro-opcode is represented by a small number of bits.

Advantageously, the synchronization mechanisms described herein provide "fine grain" synchronization capability without consuming substantial memory resources. That is, the mechanisms enhance latency as well as memory resource utilization. The memory resource enhancement is achieved by moving synchronization state information from memory to dedicated hardware registers. Synchronization latency is improved by introducing an early instruction execution mechanism that allows the barrier synchronization request to be sent before an execution phase of each processor. The early execution capability associated with the bsync micro-opcode allows "zero delay" barrier synchronization to be performed without introducing processor stall cycles.

Specifically, early execution reduces the latency of barrier synchronization at the expense of introducing an instruction that cannot be cancelled. An early execution instruction is literally executed at an early pipeline stage of the processor. A residual opcode flows through the processor pipeline for exception checking. If the barrier synchronization is part of a cancelled speculated branch sequence, then an exception is generated. An illustrative embodiment of the early execute instruction allows selectable behavior on a per instruction basis. This may be accomplished with two opcodes (e.g., early execute, non-early execute) or a single bit operand. The non-early execute version introduces additional stall cycles, but operates in conjunction with branch prediction.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for synchronizing instruction code executed by a processor of a processing engine in an intermediate network station, the processing engine configured as a systolic array having a plurality of processors arrayed as rows and columns, each processor of a column executing similar instruction code, the system comprising:
    a temporal synchronization mechanism associated with each processor of the array, the temporal synchronization mechanism including boundary logic configured to specify an offset from one of a start of a phase and relative to a marker at which execution of an instruction may be delayed.

2. The system of claim 1 wherein the temporal synchronization mechanism provides cycle-based synchronization within the processor.

3. The system of claim 1 wherein the boundary logic comprises:
    a count register of the processor, the count register containing a timer value indicating a number of clock cycles that have elapsed since the start of phase; and
    a boundary reference threshold register containing a threshold value indicating an allowable duration for execution of a code sequence on the processor.

4. The system of claim 3 wherein the processor compares the timer value with the threshold value to determine whether further program instruction code execution can proceed without incurring stall cycles.

5. A system for synchronizing instruction code executed by a processor of a processing engine in an intermediate network station, the processing engine configured as a systolic array having a plurality of processors arrayed as rows and columns, each processor of a column executing similar instruction code, the system comprising:
    a temporal synchronization mechanism associated with each processor of the array, the temporal synchronization mechanism including boundary logic configured to specify an offset from one of a start of a phase and relative to a marker at which execution of an instruction may be delayed;
    boundary logic having a count register of the processor, the count register containing a timer value indicating a number of clock cycles that have elapsed since the start of phase;
    a boundary reference threshold register containing a threshold value indicating an allowable duration for execution of a code sequence on the processor;
    said each processor compares the timer value with the threshold value to determine whether further program instruction code execution can proceed without incurring stall cycles; and
    a boundary reference (bref) instruction opcode that selectively resets the timer value to identify start of a new synchronization interval and that sets the threshold value used for comparison with the timer value.

6. The system of claim 5 wherein the bref opcode comprises an operand configured to select a specific boundary condition to thereby enable the temporal synchronization mechanism to support a plurality of boundary synchronization operations.

7. The system of claim 6 wherein the boundary logic is replicated in each processor.

8. A method for synchronizing instruction code executed by a processor of a processing engine in an intermediate network station, the processing engine configured as a systolic array having a plurality of processors arrayed as rows and columns, each processor of a column executing similar instruction code, the method comprising the steps of:
    allowing execution of a code sequence on the processor for a minimum duration specified by a duration of a duration register;
    if a code path executed by the processor completes before the specified duration, stalling the processor until the duration has elapsed; and
    if a code path execution time is greater than or equal to the specified duration, continuing execution of the code sequence on the processor without incurring stall cycles.

9. A method for synchronizing instruction code executed by a processor of a processing engine in an intermediate network station, the processing engine configured as a systolic array having a plurality of processors arrayed as rows and columns, each processor of a column executing similar instruction code, the method comprising the steps of:
    providing a synchronization operation code (opcode) adapted for execution by the processor;
    interpreting the synchronization opcode based on a state of a predetermined bit of a machine state register within the processor; and
    performing temporal synchronization when the predetermined bit is non-asserted.

10. The method of claim 9 wherein the step of performing comprises the steps of:
    bounding a minimum execution latency through a section of the code;
    identifying a start of the code section by one of a start of a software phase, a barrier event and an instruction-initiated, boundary reference opcode; and
    identifying an end of the code section by a bsync opcode.

11. A method for synchronizing instruction code within a processor of a multiprocessor system configured as a systolic array, the array having a plurality of processors arrayed as rows and columns, each processor of a column executing similar instruction code, the method comprising the steps of:
    initiating a cycle timer value responsive to the processor;
    setting a threshold value to a specified number of cycles; and
    suspending further execution of the instruction code until the timer value is greater than or equal to the threshold value.

12. The method of claim 11 further comprising the steps of:
resetting the timer value at a beginning of a phase; and
selectively resetting the timer value one or more times during the phase by executing a first instruction.

13. A method for synchronizing instruction code within a processor of a multiprocessor system configured as a systolic array, the array having a plurality of processors arrayed as rows and columns, each processor of a column executing similar instruction code, the method comprising the steps of:
initiating a cycle timer value responsive to the processor;
setting a threshold value to a specified number of cycles;
suspending further execution of the instruction code until the timer value is greater than or equal to the threshold value;
resetting the timer value at a beginning of a phase;
selectively resetting the timer value one or more times during the phase by executing a first instruction;
setting the threshold value by executing a second instruction.

14. The method of claim 13 further comprising the step of inserting a micro-opcode within the instruction code to delay execution of the instruction code until a boundary event.

15. Apparatus adapted to synchronize instruction code within a processor of a multiprocessor system configured as a systolic array, the array having a plurality of processors arrayed as rows and columns, each processor of a column executing similar instruction code, the apparatus comprising:
means for initiating a cycle timer value responsive to the processor;
means for setting a threshold value to a specified number of cycles; and
means for suspending further execution of the instruction code until the timer value is greater than or equal to the threshold value.

16. Apparatus adapted to synchronize instruction code within a processor of a multiprocessor system configured as a systolic array, the array having a plurality of processors arrayed as rows and columns, each processor of a column executing similar instruction code, the apparatus comprising:
means for initiating a cycle timer value responsive to the processor;
means for setting a threshold value to a specified number of cycles;
means for suspending further execution of the instruction code until the timer value is greater than or equal to the threshold value;
means for resetting the timer value at a beginning of a phase; and
means for selectively resetting the timer value one or more times during the phase by executing a first instruction.

17. The apparatus of claim 16 wherein the step of setting the threshold value comprises setting the threshold value by executing a second instruction.

18. The apparatus of claim 17 further comprising means for inserting a micro-opcode within the instruction code to delay execution of the instruction code until a boundary event.

19. A computer readable medium containing executable program instructions for synchronizing instruction code executed by a processor of a processing engine in an intermediate network station, the processing engine configured as a systolic array having a plurality of processors arrayed as rows and columns, each processor of a column executing similar instruction code, the executable program instructions comprising program instructions for:
providing a synchronization operation code (opcode) adapted for execution by the processor;
interpreting the synchronization opcode based on a state of a predetermined bit of a machine state register within the processor; and
performing temporal synchronization when the predetermined bit is non-asserted.

20. The computer readable medium of claim 19 wherein the program instruction for performing comprises program instructions for:
bounding a minimum execution latency through a section of the code;
identifying a start of the code section by one of a start of a software phase, a barrier event and an instruction-initiated, boundary reference opcode; and
identifying an end of the code section by a bsync opcode.

* * * * *